Patented June 13, 1939

2,162,676

UNITED STATES PATENT OFFICE 2,162,676

PREPARATION OF ACETYLENE GLYCOLS

Alexander Douglas Macallum, Niagara Falls, N. Y., assignor to E. I. du Pont de Nemours & Company, Wilmington, Del., a corporation of Delaware No Drawing. Application September 25, 1936, Serial No. 102,611

19 Claims. (Cl. 260—635)

Heretofore, the preparation of acetylene glycols of the type $R_2COHC \equiv CCR_2OH$ (where "R" may be hydrogen, an alkyl group or an aryl group) has been accomplished by reaction of various aldehydes or ketones with ethereal solutions of acetylene dimagnesium bromide (see Beilstein (4) 1, 242, 500–501; Supplemental volumes 1, 261–264 and 6, 508, and Berichte 60, 1866–1868 (1927)), a procedure which is considered to involve both expense and hazard on any scale of manufacture.

An object of this invention is to effect the preparation of the aforesaid acetylene glycols by a considerably simpler, less expensive and less hazardous procedure than has been possible heretofore. Other objects will appear hereinafter.

These objects are attained by the following invention which consists in a synthesis of such acetylene glycols by another route, as by starting directly or indirectly with an alkali acetylide, such as sodium acetylide, instead of with acetylene dimagnesium bromide.

In effect, the synthesis of such acetylene glycols can be accomplished in many cases in a clean cut way in accordance with my invention by merely heating the sodium or other alkali metal compounds of the corresponding acetylene carbinols of the general formula: $R_2CONaC \equiv CH$, (where "R" may be hydrogen, an alkyl group or an aryl group) to temperatures in excess of 35° centigrade, either alone or in suspension or solution. These sodium derivatives of the acetylene carbinols may be obtained conveniently from sodium acetylide by reaction with aldehydes or ketones, for example as described in my copending patent application, Serial No. 91,619. The production of acetylene glycols in this way appears to depend upon a slow thermal decomposition involving the fission of one molecule of acetylene from two molecules of the acetylene carbinolate accompanied by a condensation of the residues according to the following chemical equation:

$2R_2CONaC \equiv CH \rightarrow R_2CONaC \equiv CCR_2ONa + C_2H_2$

Alternative procedures for accomplishing the same result in accordance with my invention include: (1) A direct treatment of alkali metal acetylide with an aldehyde or ketone under conditions favoring the thermal decomposition of the carbinolate initially formed; (2) a treatment of an alkali metal derivative of the aldehyde or ketone with acetylene under similar conditions; or (3) a treatment of the amide, hydride, oxide, hydroxide, or alcoholate of an alkali or alkaline earth metal at moderate temperatures with a mixture comprising acetylene and an aldehyde or a ketone. In methods (2) and (3) it is evident that the alkali or alkaline earth metal derivative (i. e. alkaline metal derivative) of an ethinyl carbinol will be formed as an intermediate compound which immediately reacts as in method (1) to form the glycolate.

In synthesis of the simpler acetylene glycols by my method, it is convenient to follow the procedure mentioned above which involves a slow thermal decomposition of the sodium derivative of an acetylene carbinol, preferably prepared from stoichiometric amounts of sodium acetylide and a carbonyl compound. In this way, it is possible to obtain the sodium compounds of the glycols substantially free from byproducts other than a small amount of unreacted acetylene carbinolate. For practical purposes it is preferred to effect the reaction at temperatures substantially higher than 35° centigrade, as for example at temperatures of 60° to 100°, under which conditions formation of the glycolate from the carbinol derivative proceeds at a practicable rate of speed. Good yields of glycol (in excess of 75%) may be obtained in this way, even where substantial amounts of the acetylene carbinol are recovered unchanged. The alkali metal glycolate may be treated in known manner, e. g., with an acid, to produce the free glycol. In accordance with my invention, it is often preferable to neutralize the glycolate by reacting it with an ammonium salt, whereby the glycol, ammonia and sodium salt are formed.

In preparation of acetylene glycolates from the corresponding acetylene carbinolates in the manner described it is generally preferable to effect the thermal decomposition of the latter in a dry way without the use of solvents or diluents, since the latter tend either to decrease the reaction rate or yield or, in cases where this is not the case, to lead to side reactions involving the production of resinous materials or other byproducts.

It will be obvious from the examples cited below that the reaction leading to production of acetylene glycols in the manner described is evidently of a general character.

The acetylene glycols to be prepared by this method of synthesis may be used as such or in form of their hydrogenation or dehydration products as intermediates for resins, pharmaceutical products or for other purposes.

The following examples serve to illustrate my invention:

Example 1.—Dimethyl hexindiol (Me₂COHC≡CCMe₂OH)

Sodium acetylide (288 g., prepared from acetylene and sodamide containing some ferrous and sodium oxides) suspended in liquid ammonia (1.5 to 3 liters) is stirred with acetone (440 cc.) for 6 hours at —40° to —35° C. under a stationary atmosphere of substantially pure nitrogen. The ammonia is then allowed to boil away and the solid residue comprising sodium dimethyl ethinyl carbinol (Me₂CONaC≡CH) is heated in an atmosphere of ammonia for 18 hours at a temperature of +60° to +65° C., or for 6 hours at 100° C., to effect conversion to disodium dimethyl hexindiol.

The product is allowed to cool and treated slowly at 5–10° C. with a solution of ammonium chloride (360 g.) in water (1 liter), being stirred a number of hours or until the alkali is substantially neutralized. The mixture is now filtered, the oil layer parted from the water layer in the filtrate, the water layer and the solid filtration residue being shaken several times with chloroform to complete extraction of the dimethyl hexindiol formed in the reaction.

The separated oil and the chloroform extracts are combined and fractionally distilled at ordinary pressure to recover the chloroform and the intermediate dimethyl ethinyl carbinol (fraction b. 95–110° C.) formed in the reaction. The distillation residue which is recovered in high yield and consists almost exclusively of crystalline dimethyl hexindiol, can be purified by distillation in vacuo (b. 130–135° C. at 50 mm. pressure) or by pulverizing and extracting cold with (or by recrystallizing hot from) suitable solvents such as trichlorethylene or perchlorethylene.

The acetylene glycol obtained in this manner has the same properties as that obtained from acetylenedimagnesium bromide and acetone.

Example 2.—Dimethyl octindiol (Et(Me)C(OH)C≡CC(OH)(Me)Et)

Substitution of an equivalent of methyl ethyl ketone for the acetone used in Example 1 results exclusively in the low melting form of dimethyl octindiol (fraction b. 127.5–130° C. at 23 mm.; m. 54–55° C.) and some methyl ethyl ethinyl carbinol (MeEtCOHC≡CH), a fraction distilling at 110–121° at ordinary pressure. The recovery of the two products is almost quantitative.

Example 3.—Diisopropyl butindiol (Me₂CHCHOHC≡CCHOHCHMe₂)

This acetylene glycol is obtained in the form of a mixture of the low—and high—melting forms (fraction b. 107–140° C. at 10 mm. pressure) along with isopropyl ethinyl carbinol (Me₂CHCHOHC≡CH), recovered as a fraction b. 130–133° C. at ordinary pressure, when sodium acetylide is reacted with a molecular equivalent of isobutyraldehyde for 12 hours in liquid ammonia at —40° to —35° C., then heated in the dry condition at +60° to +65° C. for 12 hours and finally neutralizing with aqueous ammonium chloride and working up by chloroform extraction and fractionation as in Example 1.

From the mixture of glycols obtained, the high-melting form of diisopropyl butindiol can be separated by recrystallization from benzene as in the case of the mixture of glycols obtained from isobutyraldehyde and magnesium acetylene bromide (Krestinskii and Marjin: Ber. 60, 1868 (1927)).

Example 4.—Diphenyl hexindiol (Me(Ph)C(OH)C≡CC(OH)(Ph)Me)

Freshly made sodium phenyl methyl ethinyl carbinol (C₆H₅(CH₃)CONaC≡CH), prepared by reacting acetophenone with a molecular equivalent of sodium acetylide in liquid ammonia at —40° to —35° C. over a 6 hour period, on thermally decomposing in the dry way and working up as in Example (1) yields the low-melting form of diphenyl hexindiol (m. 125–126° C.) recovered in the solid state by concentrating the chloroform extracts of the neutralized reaction mixture and letting the concentrate crystallize. Some of the intermediate phenyl methyl ethinyl carbinol (fraction b. 90–110° C. at 15 mm.) is also recovered.

Example 5.—Diisobutyl hexindiol (Me(Bu)C(OH)C≡CC(OH)(Bu)Me)

The sodium derivative of methyl isobutyl ethinyl carbinol may be prepared from methyl isobutyl ketone and a molecular equivalent of sodium acetylide in liquid ammonia by a procedure substantially the same as in the above examples where other ketones are employed. If this product is heated to 60° or thereabouts it is converted to diisobutyl hexindiol, the yield depending on the period of heating. When the products are worked up as in the foregoing examples, there is obtained some unchanged methyl isobutyl ethinyl carbinol (liquid b. 80–95°/80 mm.) and a mixture of liquid and solid products which appear to be two forms of diisobutyl hexindiol. The liquid product boils at 105–120° C. (3 mm. pressure), while the solid product after crystallization from methylene chloride melts at 64–67° C.

Example 6.—Diamyl hexindiol (Me(Am)C(OH)C≡CC(OH)(Am)Me)

A similar regulated thermal decomposition of the sodium compound of methyl amyl ethinyl carbinol (prepared in substantially the same way from sodium acetylide and methyl n-amyl ketone) leads to a mixture which can be worked up in an analogous way to yield unchanged methyl amyl ethinyl carbinol (liquid b. 74–80° at 10 mm.) and a mixture of the liquid and solid forms of diamyl hexindiol (fraction b. 120–132° at 1–2 mm.) which have previously been obtained in another way from magnesium acetylene bromide (Blomquist and Marvel: J. Amer. 55, 1658 (1933)).

I claim:

1. The process which comprises heating an ethinyl carbinolate having the general formula R₂C(OM)C≡CH (where R is a substituent selected from the group consisting of hydrogen, alkyl and aryl and M is a metal selected from the group consisting of the alkali metals and alkaline earth metals) until said ethinyl carbinolate is converted in substantial amount into the corresponding acetylene glycolate.

2. The process which comprises heating an ethinyl carbinolate having the general formula R₂C(OM)C≡CH (where R is a substituent selected from the group consisting of hydrogen, alkyl and aryl and M is a metal selected from the group consisting of the alkali metals and alkaline earth metals) until said ethinyl carbinolate is converted in substantial amount into the corresponding acetylene glycolate, neutralizing said glycolate by reaction with an ammonium salt and recovering the resulting acetylene glycol.

3. The process which comprises heating an alkali metal derivative of an ethinyl carbinol having the general formula $R_2C(OH)C \equiv CH$ (where R is a substituent selected from the group consisting of hydrogen, alkyl and aryl) until said ethinyl carbinol derivative is converted in substantial amount into the corresponding acetylene glycolate.

4. The process which comprises heating the sodium derivative of an ethinyl carbinol having the general formula $R_2C(OH)C \equiv CH$ (where R is a substituent selected from the group consisting of hydrogen, alkyl and aryl), to a temperature substantially not lower than 35° C. until said ethinyl carbinol derivative is converted in substantial amount into the corresponding acetylene glycolate, neutralizing said glycolate by reaction with an ammonium salt and recovering the resulting acetylene glycol.

5. The process which comprises heating the sodium derivative of an alkyl ethinyl carbinol to a temperature substantially not lower than 35° C., until said ethinyl carbinol derivative is converted in substantial amount into the corresponding acetylene glycolate, neutralizing said glycolate and recovering the resulting acetylene glycol.

6. The process which comprises heating the sodium derivative of a dialkyl ethinyl carbinol to a temperature substantially not lower than 35° C. until said ethinyl carbinol derivative is converted in substantial amount into the corresponding acetylene glycolate, neutralizing said glycolate and recovering the resulting acetylene glycol.

7. The process which comprises heating the sodium derivative of an aryl alkyl ethinyl carbinol to a temperature substantially not lower than 35° C. until said ethinyl carbinol derivative is converted in substantial amount into the corresponding acetylene glycolate, neutralizing said glycolate and recovering the resulting acetylene glycol.

8. The process which comprises heating the sodium derivative of an aryl ethinyl carbinol to a temperature substantially not lower than 35° C., until said ethinyl carbinol derivative is converted in substantial amount into the corresponding acetylene glycolate, neutralizing said glycolate and recovering the resulting acetylene glycol.

9. The process which comprises reacting acetylene with a carbonyl compound in the presence of a substance selected from the group consisting of the amides, hydrides, oxides, hydroxides and alcoholates of the alkali and alkaline earth metals at such temperature that the resulting ethinyl carbinol is converted into an acetylene glycolate.

10. The process which comprises reacting acetylene with a carbonyl compound in the presence of a substance selected from the group consisting of the amides, hydrides, oxides, hydroxides and alcoholates of the alkali and alkaline earth metals at a temperature substantially not lower than 35° C.

11. The process which comprises reacting acetylene with a ketone in the presence of a substance selected from the group consisting of the amides, hydrides, oxides, hydroxides and alcoholates of the alkali and alkaline earth metals at such temperature that the resulting ethinyl carbinol is converted into an acetylene glycolate.

12. The process which comprises reacting acetylene with an aldehyde in the presence of a substance selected from the group consisting of the amides, hydrides, oxides, hydroxides, and alcoholates of the alkali and alkaline earth metals at such temperature that the resulting ethinyl carbinol is converted into an acetylene glycolate.

13. The process which comprises reacting acetylene with a carbonyl compound in the presence of a substance selected from the group consisting of the amides, hydrides, oxides, hydroxides and alcoholates of the alkali and alkaline earth metals in liquid ammonia solution to form an ethinyl carbinolate and thereafter heating said carbinolate to convert it into the corresponding acetylene glycolate.

14. The process which comprises reacting acetylene with a ketone in the presence of a substance selected from the group consisting of the amides, hydrides, oxides, hydroxides and alcoholates of the alkali and alkaline earth metals in liquid ammonia solution to form an ethinyl carbinolate and thereafter heating said carbinolate to a temperature substantially not lower than 35° C. until a substantial amount of said carbinolate has been converted into the corresponding acetylene glycolate.

15. The process which comprises reacting acetylene with an aliphatic ketone in the presence of a substance selected from the group consisting of the amides, hydrides, oxides, hydroxides and alcoholates of the alkali and alkaline earth metals in liquid ammonia solution to form an ethinyl carbinolate and thereafter heating said carbinolate to a temperature substantially not lower than 35° C. until a substantial amount of said carbinolate has been converted into the corresponding acetylene glycolate.

16. The process which comprises reacting acetylene with an aryl alkyl ketone in the presence of a substance selected from the group consisting of the amides, hydrides, oxides, hydroxides and alcoholates of the alkali and alkaline earth metals in liquid ammonia solution to form an ethinyl carbinolate and thereafter heating said carbinolate to a temperature substantially not lower than 35° C. until a substantial amount of said carbinolate has been converted into the corresponding acetylene glycolate.

17. The process which comprises reacting acetylene with an aldehyde in the presence of a substance selected from the group consisting of the amides, hydrides, oxides, hydroxides and alcoholates of the alkali and alkaline earth metals in liquid ammonia solution to form an ethinyl carbinolate and thereafter heating said carbinolate to a temperature substantially not lower than 35° C. until a substantial amount of said carbinolate has been converted into the corresponding acetylene glycolate.

18. The process which comprises reacting acetylene with an aliphatic aldehyde in the presence of a substance selected from the group consisting of the amides, hydrides, oxides, hydroxides and alcoholates of the alkali and alkaline earth metals in liquid ammonia solution to form an ethinyl carbinolate and thereafter heating said carbinolate to a temperature substantially not lower than 35° C. until a substantial amount of said carbinolate has been converted into the corresponding acetylene glycolate.

19. The process which comprises reacting an alkali metal acetylide with a carbonyl compound to form an ethinyl carbinolate of the alkali metal and heating said ethinyl carbinolate until it is converted in substantial amount into the corresponding acetylene glycolate.

ALEXANDER DOUGLAS MACALLUM.